(12) United States Patent
Malmgren et al.

(10) Patent No.: US 6,609,012 B1
(45) Date of Patent: Aug. 19, 2003

(54) MOBILE TERMINAL INITIATED AND ASSISTED ANTENNA SELECTION

(75) Inventors: Göran Malmgren, Hagersten (SE); Hui Li, Nürnberg (DE); Mikael Larsson, Singapore (SG); Peter Larsson, Singapore (SG)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/348,048

(22) Filed: Jul. 6, 1999

Related U.S. Application Data
(60) Provisional application No. 60/097,686, filed on Aug. 24, 1998.

(51) Int. Cl.$^7$ .................................................. H04Q 7/20
(52) U.S. Cl. ................................. 455/562; 455/561
(58) Field of Search .............................. 455/562, 561, 455/522, 69, 70, 453, 437, 272, 513, 515, 524, 525, 560

(56) References Cited

U.S. PATENT DOCUMENTS

| | | | | |
|---|---|---|---|---|
| 4,704,734 A | * | 11/1987 | Menich et al. ................. 455/33 |
| 5,117,236 A | * | 5/1992 | Chang et al. ................. 342/367 |
| 5,161,249 A | * | 11/1992 | Meche et al. ............... 455/33.3 |
| 5,303,240 A | * | 4/1994 | Borras et al. ............... 370/95.3 |
| 5,379,447 A | * | 1/1995 | Bonta et al. ................. 455/33.2 |
| 5,628,052 A | * | 5/1997 | DeSantis et al. ........... 455/33.3 |
| 5,754,959 A | * | 5/1998 | Ueno et al. .................. 455/453 |
| 6,259,918 B1 | * | 7/2001 | Labonte et al. .............. 455/437 |

FOREIGN PATENT DOCUMENTS

| | | |
|---|---|---|
| EP | 0 660 633 A2 | 6/1995 |
| EP | 0 847 209 A2 | 6/1998 |

OTHER PUBLICATIONS

European Search Report re RS 102069 US Date of mailing of search: May 6, 1999.

* cited by examiner

*Primary Examiner*—Nay Maung
*Assistant Examiner*—Jean A Gelin

(57) ABSTRACT

In a cellular, broadband radio access network, such as a High Performance Local Area Network Type 2 (HIPERLAN/2), which employs multiple antennas per base station, the process of identifying and selecting the most appropriate base station antenna to support a given mobile terminal may be accomplished more effectively by allowing the mobile terminal to initiate antenna selection and, thereafter, to identify the most appropriate one of the multiple base station antennas. By utilizing the mobile terminal in this capacity, the process of antenna selection can be accomplished more effectively even if there is relatively little uplink communication between the mobile terminal and its corresponding base station.

18 Claims, 2 Drawing Sheets

MOBILE TERMINAL INITIATED AND ASSISTED ANTENNA SELECTION

CROSS-REFERENCE TO PRIOR APPLICATIONS

The present application claims priority under 35 U.S.C. §119 to Provisional Application No. 60/097,686, filed Aug. 24, 1998, the entire content of which is incorporated herein by reference.

FIELD OF INVENTION

The present invention relates to mobile communications systems. More particularly, the present invention relates to the selection of one or more adaptive or sector antennas in a mobile communications system that employs multiple antennas per base station.

BACKGROUND

HIPERLAN/2 is a short-range, high data rate, cellular, broadband radio access network, which is mainly intended for indoor operations such as offices, conference halls, exhibitions, airports and home environments. Some outdoor scenarios are also being considered (e.g., campus areas and concentrated urban areas). The frequency spectrum to be used for H/2 is currently unlicensed. Thus, several "operators" may use the same frequency spectrum simultaneously. Furthermore, the available frequency spectrum for this system is very limited; consequently, it has been questioned whether it is possible to deploy such a cellular network.

Adaptive and/or sector antennas can be utilized to improve the capacity in such networks. With these antennas, a base station (BS) can restrict its transmission to a more definitive area or sector in which a given mobile terminal (MT) is located. Thus, radiated power into nearby areas or sectors, and interference to surrounding cells can be drastically reduced, as illustrated in FIG. 1.

Generally, in systems that employ these techniques, the uplink signaling is transmitted before the downlink signaling. The BS can then use the uplink signal to measure the relative direction of the MT. Upon determining the direction of the MT, the BS selects one of several antennas for communicating with the MT. However, this general procedure is often unacceptable, particularly when only downlink traffic is present, as the BS has no uplink signal with which to measure the relative direction of the MT. Accordingly, it would be more advantageous if the MT initiated and selected the BS antenna, rather than the BS, since the MT always knows its location. Presently, though, there exists no such protocol or technique.

SUMMARY OF THE INVENTION

The present invention involves a technique that improves the capacity in cellular, broadband radio access networks that employ multiple antenna base stations (BSs), where each cell is divided into sectors and each base station antenna is associated with a corresponding sector. Unlike conventional techniques, mobile terminals (MTs) in the present invention are employed to identify the most appropriate BS antenna from amongst multiple BS antennas. By using the MTs to identify the most appropriate BS antenna, rather than the BS, the BS antenna selection process is accomplished more efficiently and effectively, even when there is no significant uplink transmission between a given MT and the BS.

Accordingly, it is an objective of the present invention to improve the BS antenna selection process in a cellular, broadband radio access network that employs multiple antennas per BS.

It is also an objective of the present invention to improve the signal quality of the communication links between the MTs and the corresponding BS which employs multiple antennas.

It is still another objective of the present invention to reduce or minimize radiated energy and interference levels in other sectors or other cells proximally located to the sector in which a given MT is presently operating.

In accordance with one aspect of the present invention, the above-identified and other objectives are achieved through a method and a corresponding apparatus for selecting one of several base station antennas, wherein each of the base station antennas covers a corresponding sector of a cell associated with the base station. The method and corresponding apparatus involve transmitting a number of sector messages from the base station, where each sector message is associated with a corresponding sector of the cell. At a mobile terminal, the sector messages transmitted by the base station are received. The mobile terminal then determines a signal quality associated with each of the received sector messages, and based on this determination, the mobile terminal selects one of the antennas. The mobile terminal then transmits an antenna selection request message to the base station.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The present invention involves the selection of one or more antennas in a mobile communications system, and more specifically, a broadband radio access network within a mobile communications system that employs multiple antennas per base station (BS), wherein the cells are divided into a plurality of sectors, and wherein each sector is supported by a corresponding antenna transceiver. In general, a mobile terminal (MT), in accordance with exemplary embodiments of the present invention, measures the signal quality associated with each of a number of downlink signals, where each downlink signal is associated with a different, corresponding sector in the cell in which the MT is currently operating. Then, based on the signal quality measurements, the MT informs the corresponding BS which of the several antennas is preferable.

Figure 1:
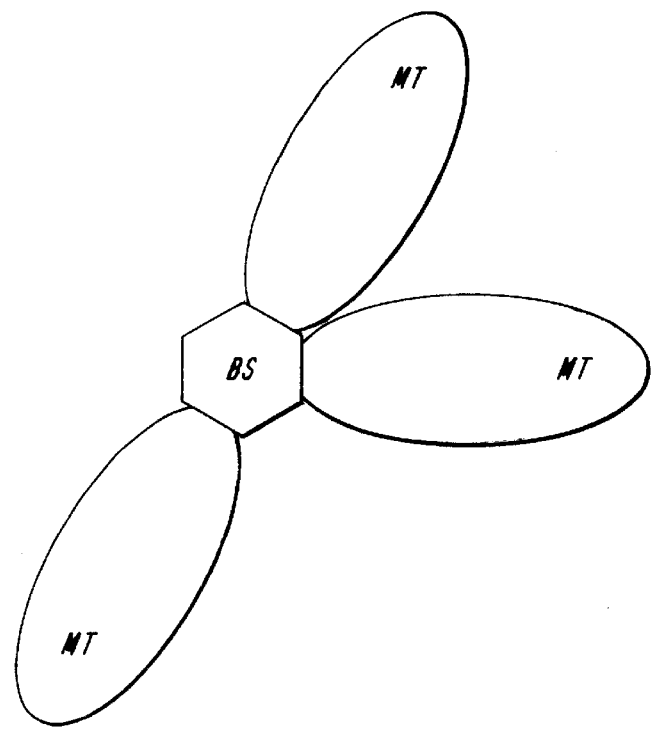
FIG. 1 illustrates a multi-sectored cell.
Figure 2:
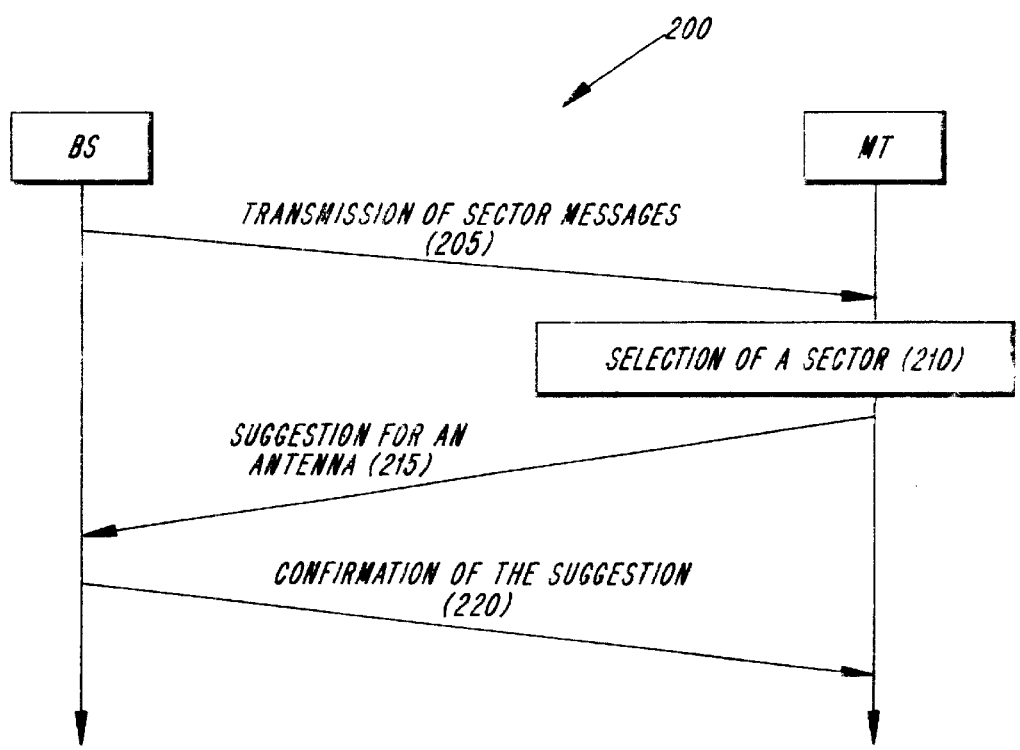
FIG. 2 depicts a technique for selecting a sector in accordance with an exemplary embodiment of the present invention.

FIG. 2 illustrates a signaling strategy 200 between a BS and a MT, in accordance with exemplary embodiments of the present invention. It will be understood that the arrows directed from the BS to the MT represent downlink channel transmissions and the arrow directed from the MT to the BS represents an uplink channel transmission.

In a first step 205, the BS transmits a sector message for each sector in a corresponding portion of the downlink channel. Each sector message includes, among other things, an antenna identity associated with the corresponding antenna and a starting location of and a total amount of the random access channel, within a present data frame, allocated to the corresponding sector.

The second step 210 in the signaling strategy 200 involves the selection of an antenna by the MT. The MT, upon receiving one or more of the sector messages, determines a value associated with any of a number of signal quality measurements for each of the one or more sector messages received. Then, based on these signal quality measurements, the MT selects a particular antenna that is most likely to guarantee satisfactory reception quality. For example, the MT might take into consideration such signal quality measurements as bit error rate (i.e., BER), signal strength, C/I ratio and/or delay spread. However, it will be understood that in deciding whether to select one antenna over another, the MT may take into consideration factors other than those directly related to signal reception quality. Therefore, the MT might ultimately select an antenna that does not guarantee the best signal reception quality. It will also be understood that the MT might receive each of the one or more sector messages from the BS over a single data frame or over several data frames.

Based on the result of step 210 described above, the MT may transmit a connection set-up request or a change of antenna request to the BS, as illustrated in step 215. The MT may, of course, transmit such a request in that portion of the uplink channel (e.g., the random access channel) reserved for the sector corresponding to the selected antenna, or in the particular case of a change of antenna request, in that portion of the uplink channel allocated to the sector corresponding to the antenna through which the MT is presently communicating.

The fourth step 220 involves the transmission of a confirmation message from the BS to the MT over the downlink channel. After receiving the connection set-up request or the change of antenna request from the MT, the BS determines whether to approve the MT's request. If the BS does approve the request, the BS transmits confirmation of such to the MT. However, there are a number of circumstances under which a BS might not approve a MT's antenna selection request. For example, a BS might disapprove a request based on an excessive amount of traffic in the sector associated with the selected antenna. In another example, the sector associated with the selected antenna may be void of any other MTs, wherein the BS may determine that the amount of overhead processing required to support a single MT in that sector is excessive and not worth the additional signal reception quality that the MT might achieve by transmitting and receiving through the selected antenna.

Figure 3:
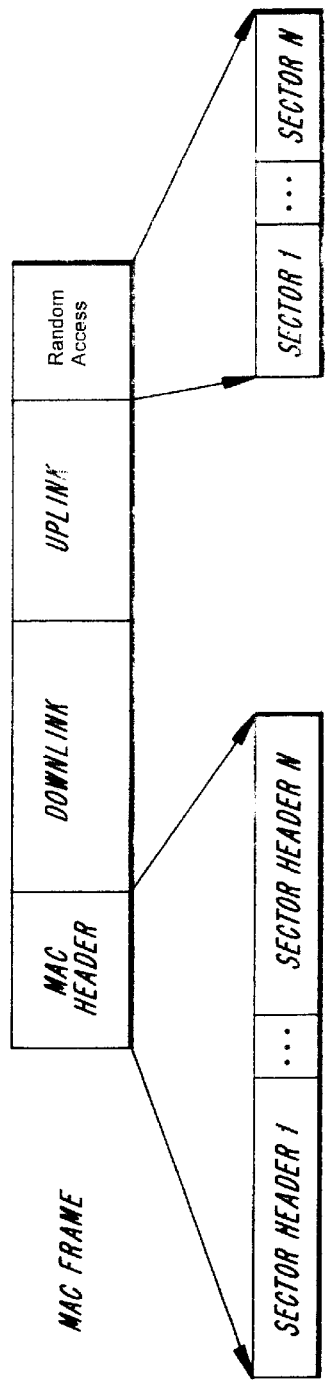
FIG. 3 depicts a MAC frame in accordance with an exemplary embodiment of the present invention.
Figure 4:
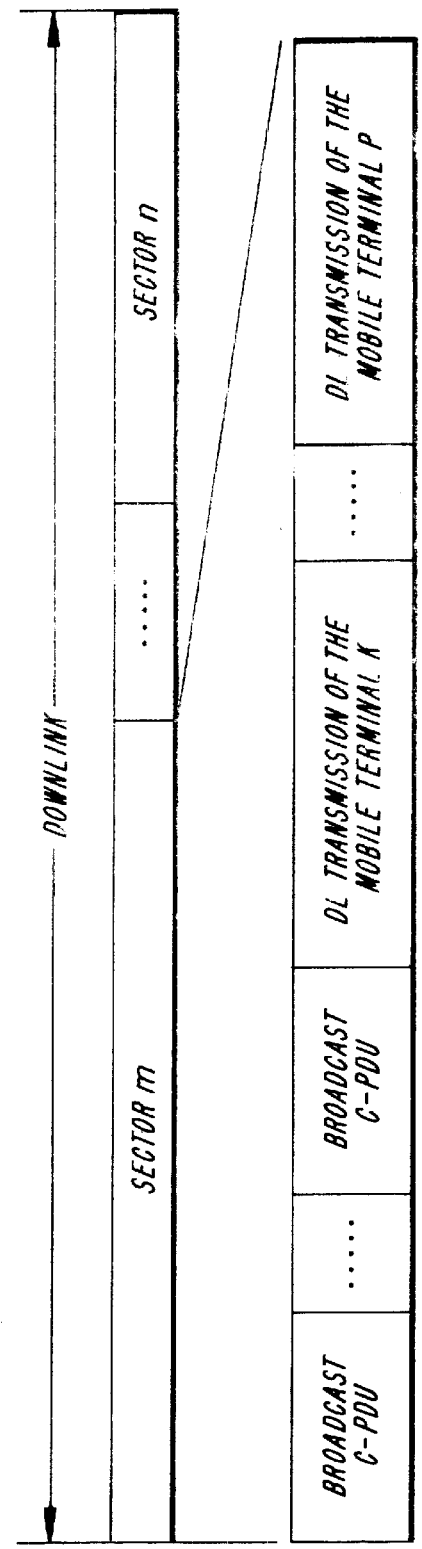
FIG. 4 depicts the format of a downlink channel of a MAC frame in accordance with an exemplary embodiment of the present invention.

In HIPERLAN/2 systems, the signaling strategy of the present invention may be integrated into the design of a MAC protocol, as illustrated in FIGS. 3 and 4. For HIPERLAN/2 systems with sectored antennas, the MAC frame header may consist of several sector headers 1 . . . N, each being transmitted separately in a broadcast message by the corresponding sectored antenna. The content of each sector header would depend on the corresponding sector, and it would include, for example, the identity of the corresponding antenna, the identity of that portion of the downlink channel allocated to the sector, and the identity of that portion of the random access channel allocated to the sector.

The downlink and uplink channel transmissions associated with each sector are multiplexed into the downlink and uplink channel of the MAC frame, respectively. For example, at the beginning of the downlink channel associated with a sector m, as illustrated in FIG. 4, several broadcast control protocol data units (C-PDUs) are transmitted. A broadcast C-PDU can be utilized to inform a given MT as to whether the BS has approved or disapproved the MT's connection set-up request or change of antenna request.

For systems employing multiple antennas per BS, the random access channel of a MAC protocol frame, like the MAC header, may also be divided into several parts, wherein each part is associated with one of a number of sectors 1 . . . N corresponding to each of a number of antennas. The length of each part being determined based on the traffic load in the sector 1 . . . N corresponding to each antenna. As stated above, a MT may transmit an antenna selection request in that portion of the random access channel allocated to the sector 1 . . . N corresponding to the selected antenna, or, alternatively, in that portion of the random access channel allocated to the sector 1 . . . N corresponding to the antenna through which the MT is currently transmitting.

The present invention has been described with reference to a number aspects and various exemplary embodiments. However, it will be readily apparent to those skilled in the art that it is possible to embody the invention in specific forms other than those described above without departing from the spirit of the invention. The various aspects and exemplary embodiments are illustrative, and they should not be considered restrictive in any way. The scope of the invention is given by the appended claims, rather than the preceding description, and all variations and equivalents thereof which fall within the range of the claims are intended to be embraced therein.

What is claimed is:

1. A method for selecting one of the multiple base station antennas in a mobile communications system that employs a base station having multiple base station antennas, wherein each of the multiple base station antennas covers a corresponding sector of a cell associated with the base station comprising the steps of:

transmitting a plurality of sector messages from the base station, wherein each of the plurality of sector messages is associated with a corresponding sector of the cell and includes an antenna identity associated with the corresponding antenna;

receiving the plurality of sector messages transmitted by the base station at a mobile terminal and determining a signal quality associated with each of the plurality of received sector messages;

selecting one of the multiple antennas as a function of the signal quality determination at the mobile terminal;

transmitting an antenna selection request message from the mobile terminal to the base station;

receiving the antenna selection request message from the mobile terminal at the base station;

determining whether the antenna selection request message is to be approved at the base station; and transmitting an antenna selection request approval confirmation to the mobile terminal upon the base station approval.

2. The method of claim 1 wherein said step of determining whether the antenna selection request message is to be approved at the base station comprises the step of:

determining a traffic load associated with the sector corresponding to the selected antenna.

3. The method of claim 1 wherein the plurality of sector messages are transmitted from the base station in a single transmission frame.

4. The method of claim 1 wherein the plurality of sector messages are separately transmitted in more than one transmission frame.

5. The method of claim 1 wherein said step of determining the signal quality associated with each of the plurality of received sector messages comprises the steps of:

measuring bit error rate, signal strength, carrier to interference ratio, and delay spread associated with each of the plurality of sector messages.

6. The method of claim 1 wherein said step of transmitting an antenna selection request message from the mobile terminal to the base station comprises the step of:

inserting the antenna selection request message into a portion of a random access channel of a mobile access protocol specifically reserved for the selected antenna.

7. The method of claim 1 wherein the antenna selection request message is part of a connection set-up request generated by the mobile terminal.

8. The method of claim 1 wherein the antenna selection request message is part of a change of antenna request generated by the mobile terminal.

9. The method of claim 8 wherein said step of transmitting the antenna selection request message from the mobile terminal to the base station comprises the step of:

inserting the antenna selection request message into a portion of an uplink channel of the mobile access protocol specifically reserved for an antenna through which the mobile terminal is presently operating.

10. An apparatus for selecting one of the multiple antennas in a mobile communications system that employs multiple antennas in a base station, wherein each of the multiple antennas provides coverage for a corresponding sector area associated with the base station comprising:

transmission means for sending one or more sector messages from the base station, reception means for receiving the one or more sector messages transmitted by the base station at a mobile terminal and processing means for determining the signal reception quality associated with each of the one or more received sector messages;

selection means for identifying one of the multiple antennas as a function of the signal reception quality determination at the mobile terminal;

transmission means for sending an antenna selection request message from the mobile terminal to the base station;

reception means for receiving the antenna selection request message from the mobile terminal at the base station;

processing means for determining whether the antenna selection request in the antenna selection request message is to be approved at the base station; and transmission means for sending an antenna selection request approval confirmation to the mobile terminal upon the base station approval.

11. The apparatus of claim 10 wherein said processing means for determining whether the antenna selection request is to be approved at the base station comprises:

processing means for determining a traffic load associated with the sector area corresponding to the selected antenna.

12. The apparatus of claim 10 wherein the one or more sector messages are transmitted from the base station in a single transmission frame.

13. The apparatus of claim 10 wherein the one or more sector messages are separately transmitted in more than one transmission frame.

14. The apparatus of claim 10 wherein said processing means for determining the signal reception quality associated with each of the one or more received sector messages comprises:

means for measuring bit error rate, signal strength, a carrier to interference ratio, and delay spread associated with each of the one or more sector messages.

15. The apparatus of claim 10 wherein said transmission means for sending an antenna selection request message from the mobile terminal to the base station comprises:

transmission means for sending the antenna selection request message over a portion of a random access channel, in a mobile access protocol, specifically reserved for the selected antenna.

16. The apparatus of claim 10 wherein the antenna selection request message is part of a connection set-up request generated by the mobile terminal.

17. The apparatus of claim 10 wherein the antenna selection request message is part of a change of antenna request generated by the mobile terminal.

18. The apparatus of claim 17 wherein said transmission means for sending the antenna selection request message from the mobile terminal to the base station comprises:

transmission means for sending the antenna selection request message over a portion of an uplink channel, in accordance with the mobile access protocol, specifically reserved for the antenna through which the mobile terminal is presently operating.

* * * * *